US011663828B1

(12) United States Patent
Shaw et al.

(10) Patent No.: US 11,663,828 B1
(45) Date of Patent: May 30, 2023

(54) SYSTEM FOR VISUAL COGNITION PROCESSING FOR SIGHTING

(71) Applicants: Colin Shaw, Rogers, AR (US); David Tanner, Franklin, MA (US)

(72) Inventors: Colin Shaw, Rogers, AR (US); David Tanner, Franklin, MA (US)

( * ) Notice: Subject to any disclaimer, the term of this patent is extended or adjusted under 35 U.S.C. 154(b) by 0 days.

(21) Appl. No.: 17/558,741

(22) Filed: Dec. 22, 2021

(51) Int. Cl.
G06V 20/00 (2022.01)
G06V 20/50 (2022.01)
G06T 7/194 (2017.01)
F41G 1/34 (2006.01)
G06T 5/00 (2006.01)
H04N 23/63 (2023.01)
H04N 23/60 (2023.01)
H04N 23/80 (2023.01)

(52) U.S. Cl.
CPC .......... G06V 20/50 (2022.01); F41G 1/345 (2013.01); G06T 5/003 (2013.01); G06T 5/006 (2013.01); G06T 5/007 (2013.01); G06T 7/194 (2017.01); H04N 23/63 (2023.01); H04N 23/64 (2023.01); H04N 23/80 (2023.01)

(58) Field of Classification Search
CPC ......... G06V 20/50; F41G 1/345; G06T 5/003; G06T 5/006; G06T 5/007; G06T 7/194; H04N 23/63; H04N 23/64; H04N 23/80
See application file for complete search history.

(56) References Cited

U.S. PATENT DOCUMENTS

| 5,267,331 | A | * | 11/1993 | Siwoff | G09B 21/008 |
| | | | | | 348/E13.067 |
| 5,359,675 | A | * | 10/1994 | Siwoff | H04N 19/597 |
| | | | | | 348/E13.067 |
| 5,526,178 | A | * | 6/1996 | Goldstein | A42B 1/247 |
| | | | | | 359/399 |
| 6,591,008 | B1 | * | 7/2003 | Surve | G06T 5/10 |
| | | | | | 382/167 |
| 6,611,618 | B1 | * | 8/2003 | Peli | G06T 5/003 |
| | | | | | 382/199 |
| 7,145,703 | B2 | | 12/2006 | Sieczka | |
| 8,130,263 | B2 | * | 3/2012 | Chang | H04N 9/68 |
| | | | | | 359/630 |
| 8,311,328 | B2 | * | 11/2012 | Spruck | G06T 7/194 |
| | | | | | 382/172 |
| 9,063,352 | B2 | * | 6/2015 | Ford | G02C 7/044 |
| 9,077,915 | B2 | * | 7/2015 | Kolstad | H04N 5/33 |
| 10,334,210 | B2 | | 6/2019 | Davidson | |
| 10,495,884 | B2 | | 12/2019 | Benesh | |
| 10,579,897 | B2 | | 3/2020 | Redmon | |
| 2004/0013314 | A1 | * | 1/2004 | Peli | G06T 5/10 |
| | | | | | 382/254 |
| 2004/0136570 | A1 | * | 7/2004 | Ullman | G09B 21/008 |
| | | | | | 382/114 |

(Continued)

Primary Examiner — Frank F Huang
(74) Attorney, Agent, or Firm — Wright Lindsey Jennings, LLP; Meredith Lowry

(57) ABSTRACT

A system for visual cognition processing for sighting, effectively a rifle scope apparatus, is a system that transforms one or more captured image streams through image processing and complex scene analysis including detection, segmentation, keypoints, identification and visual cognition processing that generates a display image visible to a viewer on a display where the complete analysis of the scene can be computed on the sighting device or on a separate computation platform.

18 Claims, 13 Drawing Sheets

(56) References Cited

U.S. PATENT DOCUMENTS

| | | | | |
|---|---|---|---|---|
| 2009/0195652 A1* | 8/2009 | Gal | ............................ | F41G 3/22 |
| | | | | 348/148 |
| 2011/0164122 A1* | 7/2011 | Hardacker | ............ | H04N 13/327 |
| | | | | 348/56 |
| 2012/0218633 A1* | 8/2012 | Cincotti | .................. | G02B 3/005 |
| | | | | 359/619 |
| 2013/0286216 A1* | 10/2013 | Lupher | ..................... | F41G 3/06 |
| | | | | 348/169 |
| 2013/0329211 A1* | 12/2013 | McHale | .................. | F41G 3/065 |
| | | | | 356/4.01 |
| 2016/0137129 A1* | 5/2016 | Mawhinney | ............. | B60R 1/006 |
| | | | | 348/148 |
| 2019/0349553 A1* | 11/2019 | Davidson, Jr. | .......... | G01C 11/00 |
| 2020/0160087 A1* | 5/2020 | Redmon | ................. | G06V 20/20 |

\* cited by examiner

SYSTEM FOR VISUAL COGNITION PROCESSING FOR SIGHTING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present disclosure is generally related to rifle scopes, and more particularly to visual cognition processing mechanisms to improve performance of similarly scoped rifles.

Conventionally one using a rifle aligns two sights at the fore and aft of the barrel with the target (e.g. iron sights), uses a telescopic sight to do the same, or uses a red dot or holographic sight to do the same. While there are pros and cons to each approach in different theaters of operation, we are concerned here with those theaters where situational awareness, speed of decision making and reflex are critical. In these conditions, the speed to get the rifle on target with accuracy (both positional and identification) is critical, while also keeping the user focused on the wider peripheral environment for the purposes of detecting additional potential threats is mutually critical.

Consequently, the greatest utility for a sighting system designed to support engagement in rapidly changing, potentially close quarters situations is one that supports to the greatest extent possible the human visual cognition system. Traditional sights such as iron sights can be sluggish in these situations because of the cognitive burden of aligning two sights with different focal planes. Telescopic sights can inhibit peripheral vision, increase the time required to acquire the target because of excessive magnification at close ranges, and have issues with parallax that are incurred when the user's eye is off axis. Red dot sights reduce the impact of focusing on two sights by leaving the focus at infinity, and work to solve the situational awareness problem, but exhibit parallax when an operator's eye is off axis. Holographic sights help solve this and generally further enhance situational awareness.

The prior art in this area does not provide a solution that augments the natural capability of the human visual cognition system.

U.S. Pat. No. 7,145,703 issued to Sieczka et al. on Dec. 5, 2006 entitled "Low profile holographic sight and method of manufacturing same" teaches a low profile holographic sight that includes a base having a mounting mechanism and a body mounted on the base for housing a laser diode, an associated electronic control and power source, and optical elements including a collimator, a transmission image hologram of the reticle pattern, and a reflective diffraction grating, wherein the optical elements are arranged within the body to direct and fold the laser beam in a substantially generally horizontal path, and is insensitive to drift in laser wavelength. The optical elements superimpose an image of the reticle pattern over the direct view of the target scene in a generally parallel and close relationship with the barrel of a firearm, such as a shotgun or a rifle, upon which the sight is mounted. This invention, known to those of ordinary skill in the art as an holographic sight, while an incremental advance over its prior art, does not provide significant augmentation to the human visual cognition for the sighting task such as the present invention addresses.

U.S. Pat. No. 10,495,884 issued to Benesh et al. on Dec. 3, 2019 entitled "Visual perception enhancement of displayed color symbology" teaches enhanced visual perception of augmented reality presentation where color attribute determination obtained from users previously at background environment dictates color attribution for a current user in the same location with the same line of sight. This invention demonstrates the benefits of color symbology in human visual cognition tasks, providing guidance for the effective use of color in visual display systems that augment the human visual cognition function.

U.S. Pat. No. 10,334,210 issued to Davidson et al. on Jun. 25, 2019 entitled "Augmented video system providing enhanced situational awareness" teaches enhanced situational awareness used in conjunction with image data by projecting overlays onto captured video data. The facility also provides enhanced zoom techniques that allow a user to quickly zoom in on an object or area of interest. This invention demonstrates the benefits of visual augmentation related to situational awareness in human visual cognition tasks, suggesting the use of visual artifacts overlaid on visual display systems to augment human cognitive function.

U.S. Pat. No. 10,579,897 issued to Redmon et al. on Mar. 3, 2020 entitled "Image based object detection" teaches object detection and classification from an image sensor by applying a convolutional neural network to the image to obtain localization data to detect an object depicted in the image and to obtain classification data to classify the object. The object detection and classification is performed by a convolutional neural network that has been trained in part using training images with associated localization labels and classification labels, the result being a model capable of producing annotations of new images with localization and classification labels. This invention demonstrates the benefit of a class of problem solving known to one of ordinary skill in the art as deep learning to visual tasks using digitized images, which is related to the present invention in augmenting human visual cognition as an effective class of computational analysis techniques that can be used to create the cognitive elements required to augment human visual cognition.

All of the prior art teachings in sighting are incremental advances. For the operator or hunter who is working in close proximity to rapidly evolving situations, best performance is achieved by using a sighting system that augments the natural capability of the human visual cognition system. Systems that explicitly support the natural capability of the human visual cognition system are aligned with the needs of operators and hunters to achieve higher accuracy with lower risk due to improper identification and aim precision in complex and rapidly changing situations.

All of the prior art teachings in perception enhancement demonstrate capability of enhancing human cognition by using previously observed scenes as perceptual enhancing memories for marking up currently observed scenes. These prior art teachings further support the presentation of supplementary data to further enhance perception.

All of the prior art teachings regarding object detection in images demonstrate the utility of using convolutional neural networks and similar deep learning techniques to solve the problem of localization and classification of objects present in images. For one of ordinary skill in the art, convolutional neural networks and deep learning techniques in general provide a wide range of capabilities in understanding aspects of images such as object detection, segmentation, keypoints and identification.

SUMMARY

In one embodiment, a rifle scope that augments visual cognition for sighting has at least one camera as input. The camera can be any of visual, near infrared, long wavelength infrared or other types of two dimensional, high resolution input. Once a frame is received and basic image processing is complete, the rifle scope puts the frame on an internal source image bus. This bus is accessible to a computational mechanism that facilitates the computation of detection, segmentation, keypoints, and identification of objects in the field of vision of the frame. The rifle scope performs visual cognition processing to include the images on the shared source image bus, detection, segmentation, keypoints, identification and external data, the result of which is placed on a display image bus for display to a viewer.

In another embodiment, the source image bus and the display image bus are abstractions that facilitate the computation related to detection, segmentation, keypoints, and identification of objects in the field of vision of the frame being processed remotely. In this embodiment, the cameras and initial image processing, as well as the display itself, are physical components of the rifle scope mounted to the rifle, whereas the computation facility can be remotely engaged by way of the source image bus and the display image bus. This embodiment allows for a small, lower powered device mounted on the rifle itself, but requires the implementation of the more computationally complex components to be remotely accessed via the source image bus and display image bus to provide the computationally complex requirements of the invention.

DETAILED DESCRIPTION OF THE INVENTION

Figure 1:
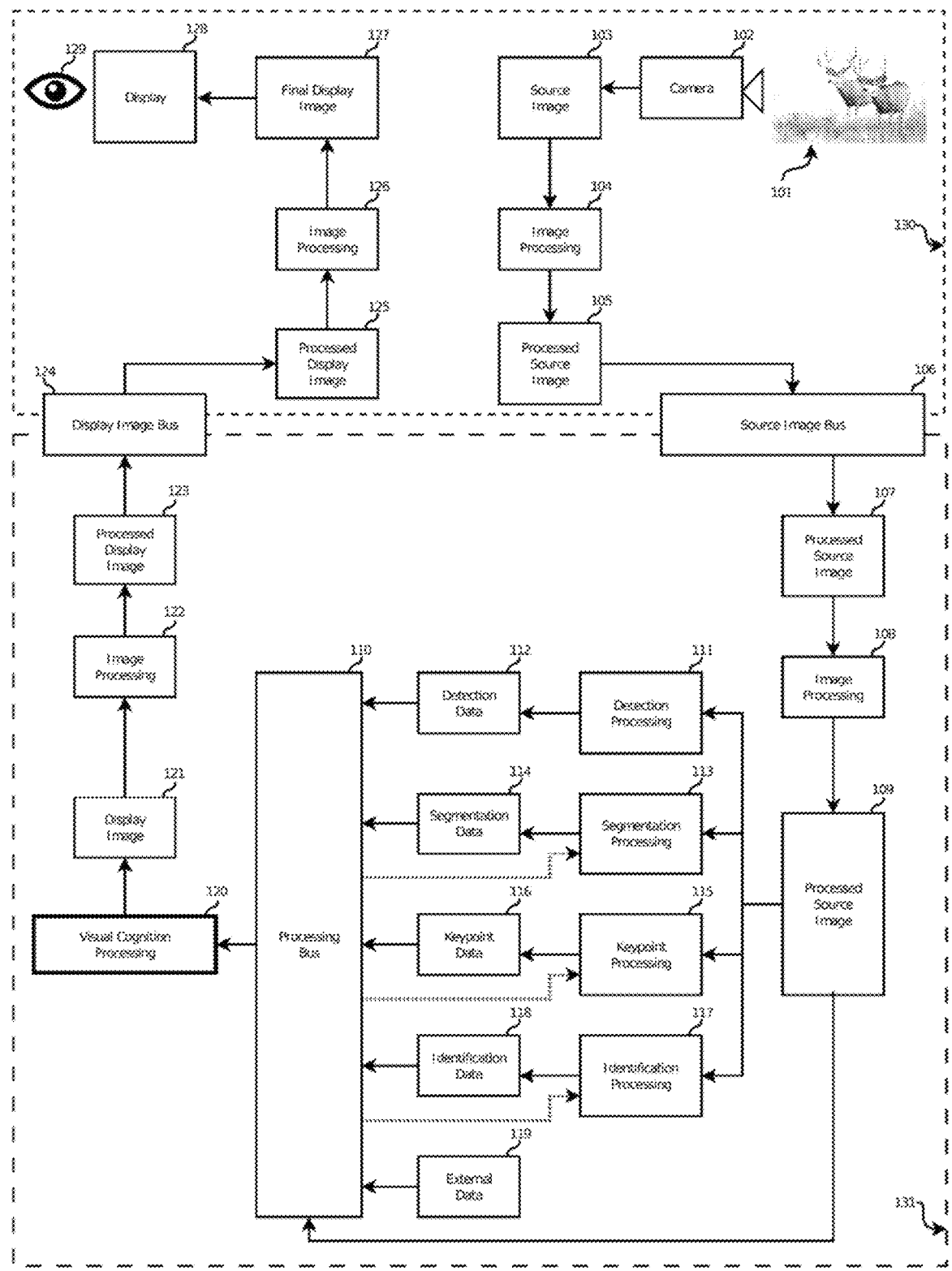
FIG. 1 is a functional diagram depicting the complete flow of data from images taken of a scene through display to the eye.

Embodiments of a system for visual cognition processing for sighting are described below. The system for visual cognition processing for sighting consists generally a camera having the circuitry required to capture one or more images of different spectral composition, such as visible, infrared, long wave infrared or thermal, the facility to mount the sight on a rifle, a processor, memory, and a communication system to process the captured images, and a display to receive and display processed images, and in one embodiment the means of relocating computationally complex aspects of the invention away from the system mounted on the rifle by means of a wireless bus structure.

As used herein, the term "bus" refers to a subsystem that transfers data between various components. A bus generally refers to the collection of communication hardware interfaces, interconnects, architectures and protocols defining the communication scheme for a communication system or communication network. A bus may also specifically refer to a part of a communication hardware that interfaces the communication hardware with the interconnects that connect to other components of the corresponding communication network. The bus may be for a wired network, such as a physical bus, or wireless network, such as part of an antenna or hardware that couples the communication hardware with the antenna. A bus architecture supports a defined format in which data is arranged when sent and received through a communication network. A bus architecture can be capable of queuing the data, which can include the depth of the queue, the disposition of queued data after being read, whether or not the queued data is persistent and other similar operational parameters.

As used herein, the term "camera" refers to any device capable of sampling focused electromagnetic radiation in a two dimensional array. The size of the two dimensional array is referred to as the resolution. The collection of this data is synchronous and is performed in some time period. The camera here is taken as any device that is capable of this detection operating in the visible, near infrared, long wave infrared, thermal, ultraviolet and related spectrums. A camera has a lens that is directed at a subject that has a focal length determining how much of the subject is in the field of view, which is taken to mean how much of the subject is recorded on the two dimensional array. The specific type of camera referred to in this document is one that can produce a digitized representation of the two dimensional array and output it in a common format for subsequent processing. The digitized representation of the two dimensional data is referred to as an image. The elements of an image are known as pixels.

As used herein, the term "image processing" refers to a collection of calculated transformations on the digitized image as produced by a camera. For one of ordinary skill in the art, a transformation for image processing may be chosen from the group including geometric transformations, mask transformations, and point transformations. One or more transformations may be chosen. Geometric transformations may include one or more processing actions chosen from the group including lens distortion correction, lens transformation, scale change, cropping, reflection, rotation or shear. Mask transformations may include one or more processing actions chosen from the group including blurring, sharpening, or spatial spectral filtering. Point transformations may include one or more processing actions chosen from the group including contrast, brightness, gamma correction, or color manipulation. The result of image processing is another digitized image.

As used herein, the term "permanent storage" refers to storage on a device that is used to load relatively static data. Relatively static means that the permanent storage data can be updated, but not as part of the process described by the invention herein. An example of permanent storage in this context could be the use of a microSD card containing data. In this case it is easily possible to exchange one microSD card for another, but within the scope of the operation of the invention described herein the storage is effectively permanent. Another example of permanent storage in this context could be the use of an automatic updating routine to update specific data considered to be permanent storage. An example of this might be rolling updates on a computing device where automated rolling updates replace relatively static data on permanent storage with other relatively static data. In this context, the update itself is not within the scope of the operation of the invention described herein and the deployed assets are considered relatively static and accessible on permanent storage.

As used herein, the term "deep learning" refers to a type of computational process using an artificial neural network having numerous layers that is capable of transforming data represented in one format into data represented in another format. One embodiment of this transformation could be the transformation of digitized image data into digitized image data representing specifically selected features in the original digitized image. Another embodiment of this transformation could be the transformation of digitized image into tabular data representing specifically selected features of the original digitized image.

As used herein, the term "detection" refers to a computational process performed on a digitized image whereupon a list of rectangular locations of particular classifications of item is produced. Detection can be capable of producing a list of separate instances of the same classification of item. The term "detection" does not imply a specific method, but, as is known to one with ordinary skill in the art, is commonly accomplished using deep learning.

As used herein, the term "segmentation" refers to a computational process performed on a digitized image whereupon a second digitized image is produced that indicates the location of specific items in the original digitized image, known as a segmentation mask. The segmentation mask is encoded to reflect the possibility of a plurality of items and is the same resolution as the initial digitized image. Specifically, segmentation produces a resulting digitized image that demonstrates where in the source digitized image specific known objects are located on the basis of specific pixels. The term "segmentation" does not imply a specific method, but, as is known to one with ordinary skill in the art, is commonly accomplished using deep learning.

As used herein, the term "keypoint processing" refers to a computational process performed on a digitized image whereupon a list of locations of specific consistent features are located. Keypoints can be related to specific instances of subjects in the original digitized image. Examples of keypoints could be the nose or ear of a person represented in the original digitized image. A collection of keypoints can be referred to as the pose of the subject. The term "keypoint processing" does not imply a specific method, but, as is known to one with ordinary skill in the art, is commonly accomplished using deep learning.

As used herein, the term "identification" refers to a computational process performed on a digitized image whereupon a nearest match against a collection of known digitized images is made. The digitized image is transformed through the computational process to a latent representation of the image, which is compared with latent representations of the collection of known digitized images. The latent representations are constructed in such a way that metrics such as distance are meaningful. Specifically, ranking the distances from the original latent representation to each of the known latent representations determines the identity of the subject of the candidate digitized image. The term "identification" does not imply a specific method, but, as is known to one with ordinary skill in the art, is commonly accomplished using deep learning.

As used herein, the term "visual cognition processing" refers to a collection of calculated transformations on a collection of digitized images and data derived from digitized images through detection, segmentation, keypoint processing, identification and other data. Visual cognition processing specifically refers to the practice of compositing the various digitized images and data to produce a single resulting digitized image.

As used herein, the term "kinematic modeling" refers to a broad set of modeling techniques applicable to the motion of rigid bodies using computational mechanisms. Kinematic modeling typically assumes equations of motion that define the possible states and behaviors of a rigid body. An example of kinematic modeling is the bicycle model for wheeled vehicles with steering. In this example, there are equations for kinematic motion of the vehicle that are determined by the dimensions, weight and other properties of the model. Measurements from the real world can be applied to the model to create a representative model of the kinematics of physical objects. The principles of kinematic modeling can be used to accomplish tasks such as tracking a point in space.

As used herein, the term "Kalman filtering" refers to a particular type of kinematic modeling based on linear dynamical system modeling that assumes a model of noise and is useful for determining and predicting modeled behavior in a noisy environment. An example use of Kalman filtering is tracking the location of an object when there is known noise in the acquisition of estimates of the state of the linear dynamical system.

As used herein, the term "morphological operations" refers to any of a collection of computational techniques used in computer vision that perform operations on an image on the basis of shape. Examples of morphological operations may include, but are not limited to, erosion, dilation, opening and closing. Morphological operations are useful to the present invention in the context of visual cognition processing. More specifically, morphological operations are pertinent to aspects of visual cognition processing having to do with compositing various types of image and other data to form a display image.

As used herein, the term "service oriented architecture" refers to a design pattern in software engineering where functionality is decomposed into independent services that can be organized and operated independently. The particular services are then exposed for an application to utilize using a request-response pattern. A request-response pattern is one where a response is made for a specific request containing all of the information required to fulfill the response using a known service. Service oriented architectures typically are facilitated by understanding deployment as the ability to put a simple object into production by copying a tem plated image to a functionally similar group of services that have requests dispatched to them to facilitate throughput requirements. Service oriented architectures offer resilience and scalability that is not found in other types of architecture design.

As used herein, the term "data pipeline architecture" refers to a design pattern in software engineering where functionality is decomposed into pipelines for data that represent data flow in the system. The pipelines in this pattern of system design have greater complexity in terms of being able to coordinate their actions than a simple request-response system. Generally in a data pipeline architecture a source places data into the pipeline, and the pipeline places resultant data onto a queued bus that may or may not be integral to the pipeline itself. Benefits of a data pipeline architecture include the ability to easily change the flow of data by altering the arrangement of the data pipelines. Complexity in the logic for routing data is distributed through the architecture rather than concentrated at specific points. Data pipeline architectures also are more easily described conceptually because diagrams representing the pipeline appear more like a flow chart. However, data pipeline architectures can suffer throughput issues due to limitations created by distributed bottlenecks and inability of specific pipelines in the architecture to handle the requisite throughput.

The general flow of data in any embodiment is that one or more images of a scene are captured and transformed using image processing to compensate for lens effects and improve fidelity. These images are fed over the first bus to the facility for computing functional decompositions of the image. These functional decompositions are specifically detection, segmentation, keypoint and identification. The resultant data having to do with detection, segmentation, keypoint and identification are combined with one or more source images and external data to form a display image. The particular transformations and markup afforded by the decomposition of the images and subsequent transformation and markup of the input images is the essence of the invention, as it is these operations that afford processing of visual cognition elements for a sighting system. The details of the differences in embodiments, specifically whether or not the computationally complex operations are performed on-device or off-device via a wireless bus, or the specific paradigm of computation, are unrelated to the present invention.

FIG. 1 is a functional diagram depicting the flow of data through the communication system and the processing of data captured from scene 101 and presented to viewer 129. The communications system generally includes the source image bus 106, the processing bus 110, the display image bus 124, and other communication hardware. A single or plurality of cameras 102 are each operating in a at least one light spectrum. The operating spectrum is at least one selected from the group of visible spectrum, near infrared spectrum, long wave infrared spectrum, thermal imaging or other similar spectrums. The number and type of cameras 102 depends on the requirements for a given environment. The single or plurality of cameras 102 are each oriented in the same manner toward scene 101, resulting in a single or plurality of source images 103. The single or plurality of source images 103 are captured by the single or plurality of cameras 102 in real time with minimal latency and at a sufficient rate to make the invention practical for field use. Each of the single or plurality of source images 103 undergoes image processing 104, resulting in a single or plurality of processed source images 105. Details of image processing 104 are provided on FIG. 2. A single or plurality of processed source images 105 are placed on source image bus 106.

A single or plurality of processed source images 107 are retrieved from source image bus 106. The single or plurality of source images 107 undergo image processing 108, resulting in a single or plurality of processed source image 109. Details of image processing 108 are provided on FIG. 2. The single or plurality of source images 109 are placed on processing bus 110. A single or plurality of processed source images 109 undergo detection processing 111, resulting in detection data 112. Detection data 112 is placed on processing bus 110. Details of detection processing 111 are provided on FIG. 3 and FIG. 4. A single or plurality of processed source images 109, optionally with detection data from processing bus 110, undergo segmentation processing 113, resulting in segmentation data 114. Segmentation data 114 is placed on processing bus 110. Details of segmentation processing 113 are provided on FIG. 5 and FIG. 6. A single or plurality of processed source images 109, optionally with detection data from processing bus 110, undergo keypoint processing 115, resulting in keypoint data 116. Keypoint data 116 is placed on processing bus 110. Details of keypoint processing 115 are provided on FIG. 7 and FIG. 8. A single or plurality of processed source images 109, optionally with detection data from processing bus 110, undergo identification processing 117, resulting in identification data 118. Identification data 118 is placed on processing bus 110. Details of identification processing 117 are provided on FIG. 9 and FIG. 10. External data 119 is placed on processing bus 110.

Detection data 112, segmentation data 114, keypoint data 116, identification data 118, external data 119 and a single or plurality of processed source images 109 are retrieved from processing bus 110 by visual cognition processing 120. Details of visual cognition processing 120 are provided on FIG. 11. The result of visual cognition processing 120 is display image 121. Display image 121 undergoes image processing 122, resulting in processed display image 123. Details of image processing 122 are provided on FIG. 2. Processed display image 123 is placed on display image bus 124.

Processed display image 125 is retrieved from display image bus 124. Processed display image 125 undergoes image processing 126, resulting in final display image 127. Details of image processing 126 are provided on FIG. 2. Final display image 127 is presented on display 128 for observation by viewer 129. Details of the complete transformation from scene 101 to display image 127 are provided on FIG. 12.

Functional block 130 depicts the elements of the invention that relate to the acquisition of data representing scene 101; image processing 104 of a single or plurality of source images 103 from a single or plurality of cameras 102 to produce a single or plurality of processed source images 105; placing a single or plurality of processed source images on source image bus 106; retrieving processed display image 125 from display bus 124; image processing 126 of processed display image 125 to produce final display image 127; display of final display image 127 on display 128 for viewer 129.

Functional block 131 depicts the elements of the invention that relate to computationally complex processing to support visual cognition processing. This includes retrieval of a single or plurality of processed sources images 107 from source image bus 106; image processing 108 of a single or plurality of processed source images 107 to produce a single or plurality of processed source images 109; placement of a single or plurality of processed source images 109 on processing bus 110; use of a single or plurality of processed source images 109 to produce detection data 112 through detection processing 111; placing detection data 112 on processing bus 110; use of a single or plurality of processed source images 109, optionally with detection data 112 retrieved from processing bus 110, to produce segmentation data 114 through segmentation processing 113; placing segmentation data 114 on processing bus 110; use of a single or plurality of processed source images 109, optionally with detection data 112 retrieved from processing bus 110, to product keypoint data 116 through keypoint processing 115; placing keypoint data 116 on processing bus 110; use of a single or plurality of processed source images 109, optionally with detection data 112 retrieved from processing bus 110, to produce identification data 118 through identification processing 117; placing identification data 118 on processing bus 110; placing external datas 119 on processing bus 110; retrieving a single or plurality of processed sources images 109, detection data 112, segmentation data 114, keypoint data 116, identification data 118 and external data 119 for visual cognition processing 120, resulting in display image 121; image processing 122 of display image 121, resulting in processed display image 123; placing processed display image 123 on display image bus 124. Functional block 131 represents a data pipeline architecture approach to visual cognition processing.

Figure 2:
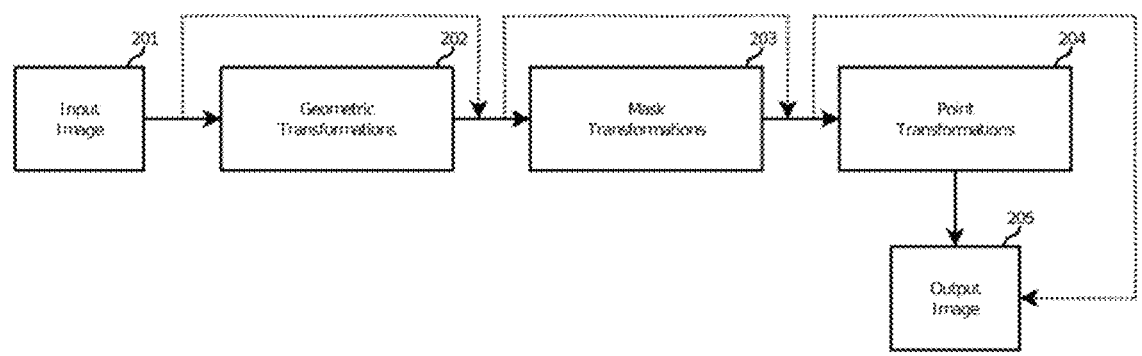
FIG. 2 is a functional diagram depicting the generic components of image processing used in the invention.

FIG. 2 is a functional diagram depicting the operational aspects of image processing that transform input image 201 into output image 205. Input image 201 undergoes optional geometric transformations 202, which may include any or all of lens distortion correction, scale change, cropping, reflection, rotation, shear and other similar transformations. The result of optional geometric transformations 202 is optional mask transformations 203, which may include any or all of blurring, sharpening, spatial spectral filtering and other similar transformations. The result of optional mask transformations 203 is optional point transformations 204, which may include any or all of contrast, brightness, gamma correction, color manipulation and other similar transformations. The result of optional point transformations 204 is output image 205. There is nothing specific about the ordering of optional geometric transformations 202, optional mask transformations 203 or optional point operations 204 that is relevant to the invention. One of ordinary skill in the art will recognize and understand the extent of similar transformations categorized under geometric transformations 202, mask transformations 203 and point transformations 204.

Figure 3:
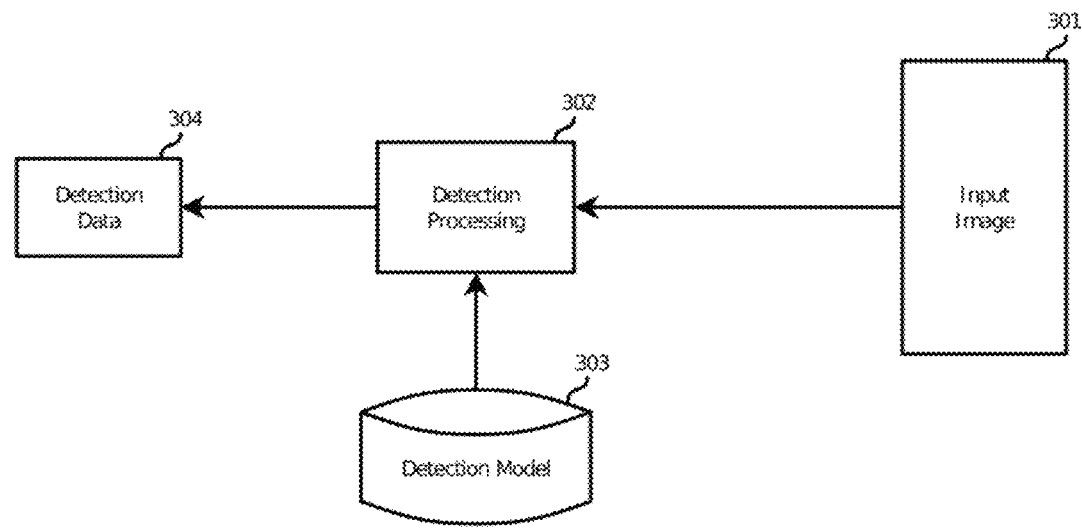
FIG. 3 is a functional diagram depicting the specific operation of the detection model used in the invention.

FIG. 3 is a functional diagram depicting the specific operation of detection processing 302. Detection processing 302 loads detection model 303 from permanent storage. Input image 301 is fed to detection processing 302. Detection processing 302 calculates detection data 304. Detection data 304 provides an understanding of where in input image 301 specific classes of object are located in terms of bounds for specific instances of the class of object, as well as the specific names of the classes associated with the specific instances of the classes of objects. Detection models can be capable of using multiple images as well as a single image.

Figure 4:
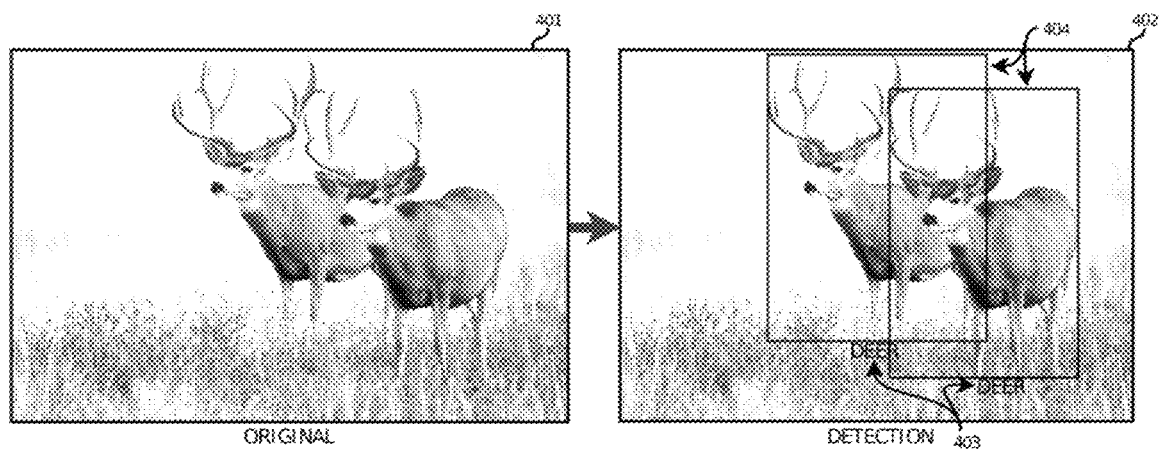
FIG. 4 is an illustration of what detection means visually.

FIG. 4 is a diagram illustrating the results of detection processing. When processed, input image 401 is transformed into detection data 402 that represents the enumerated classes 403 in input image 401. Enumerated classes 403 are associated with estimators of the specific locations 404 of classes 403 in input image 401. One embodiment of detection processing is the transformation of input image 401 into detection class data 403 and detection location data 404. Another embodiment of detection processing is the transformation of input image 401 into detection location data 404 for a specific single detection class, a degenerate case with no disambiguation required between multiple classes. This figure depicts the enumerated classes 403 and the estimators of the specific locations 404 of classes 403 as visually apparent bounding boxes for the class "deer." This figure is a visual representation of detection data 402 applied to input image 401; detection data 402 is more typically a list of classes 403 and specific locations 404 corresponding to classes 403.

Figure 5:
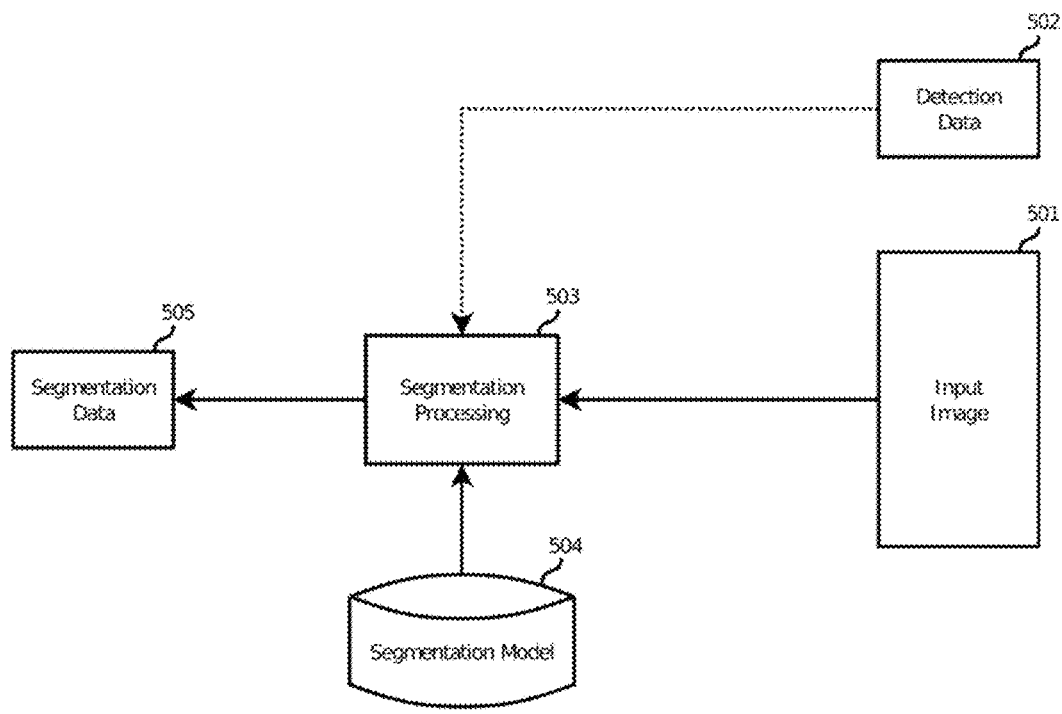
FIG. 5 is a functional diagram depicting the specific operation of the segmentation model used in the invention.

FIG. 5 is a functional diagram depicting the specific operation of segmentation processing 503. Segmentation processing 503 loads segmentation model 504 from permanent storage. Input image 501 is fed to segmentation processing 503 along with optional detection data 502. Segmentation processing 503 calculates segmentation data 505. Segmentation data 305 provides an understanding of where in the input image 501 specific features are located on a pixel by pixel basis. Segmentation models can be capable of multiple images as well as a single image. The reason for optional detection data 502 is that some segmentation models require detection to propose regions where specific classes are detected whereas others do not.

Figure 6:
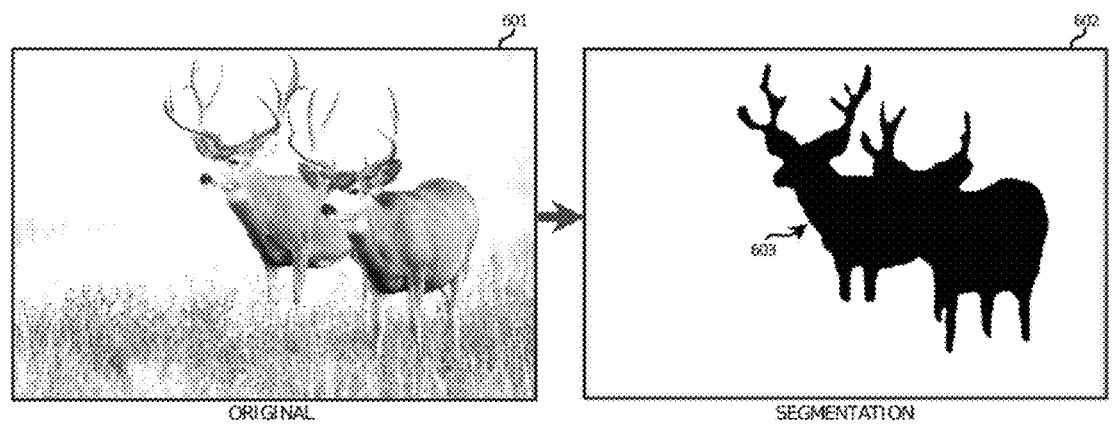
FIG. 6 is an illustration of what segmentation means visually.

FIG. 6 is a diagram illustrating the results of segmentation processing. When processed, input image 601 is transformed into segmentation data 602 that represents the specific location on a pixel basis of object 603. One embodiment of segmentation processing may combine different instances of a specific object class in input image 601. Another embodiment of segmentation processing may differentiate different instances of a specific object class in input image 601. This figure depicts the embodiment of segmentation processing of input image 601 where specific instances of a common object class are not differentiated. In this figure, segmentation data 602 depicts locations of specific classes of object 603 identified at the pixel level.

Figure 7:
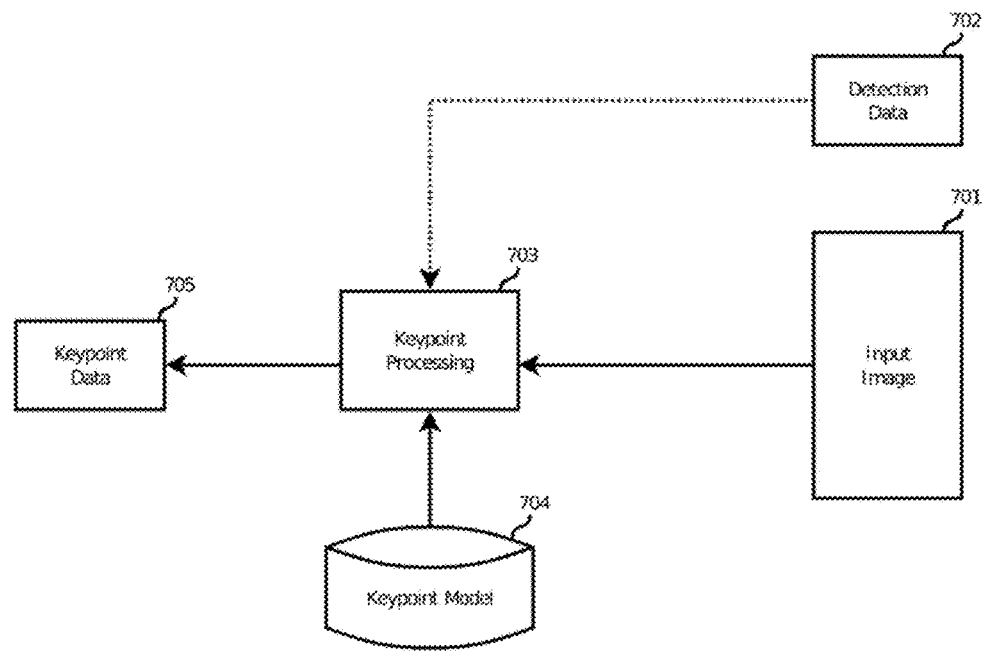
FIG. 7 is a functional diagram depicting the specific operation of the keypoint model used in the invention.

FIG. 7 is a functional diagram depicting the specific operation of keypoint processing 703. Keypoint processing 703 loads keypoint model 704 from permanent storage. Input image 701 is fed to keypoint processing 703 along with optional detection data 702. Keypoint processing 703 calculates keypoint data 705. Keypoint data 705 provides an understanding of where in input image 701 specific features are located in terms of precise coordinates. Keypoint models can be capable of using multiple images as well as a single image. The reason for optional detection data 702 is that some keypoint models require detection to propose regions where specific classes are detected whereas others do not.

Figure 8:
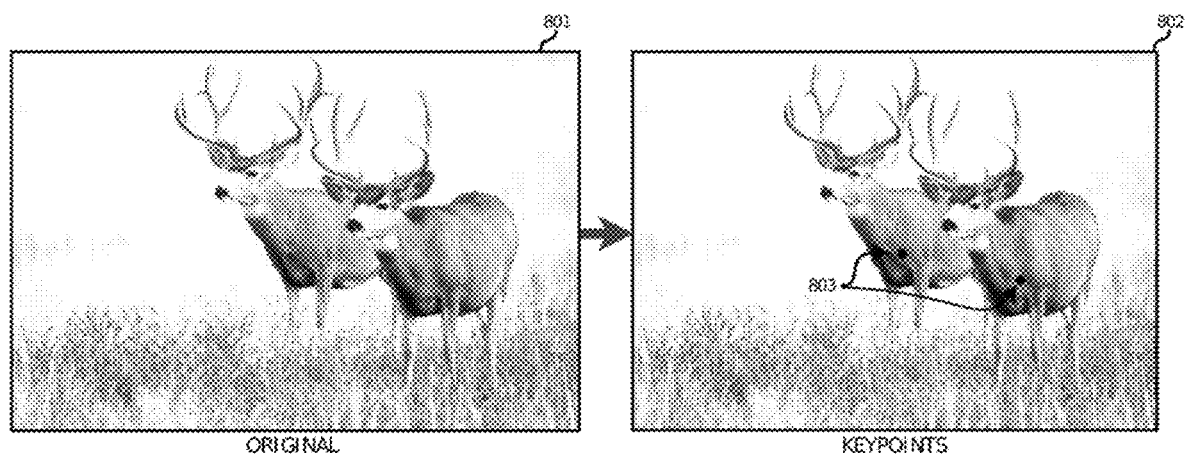
FIG. 8 is an illustration of what keypoint means visually.

FIG. 8 is a diagram illustrating the results of keypoint processing. When processed, input image 801 is transformed into keypoint data 802 that represents the specific location of landmarks of interest 803, or keypoints, of specific objects in input image 801. One embodiment of keypoint processing may combine different instances of the same type of keypoint in input image 801. Another embodiment of keypoint processing may provide instance-based identification of keypoints for multiple similar objects in input image 801. This figure depicts potential shot placements as keypoint data 802, representing landmarks of interest 803 as critical target areas on input image 801. The figure depicts the disambiguation of the two objects in input image 801, providing instance-based generation of keypoints data 802 representing the specific landmarks of interest 803 of the two object instances. This figure is a visual representation of keypoint data 802 applied to input image 801; keypoint data 802 is more typically a list representing estimates for the location of landmarks of interest 803.

Figure 9:
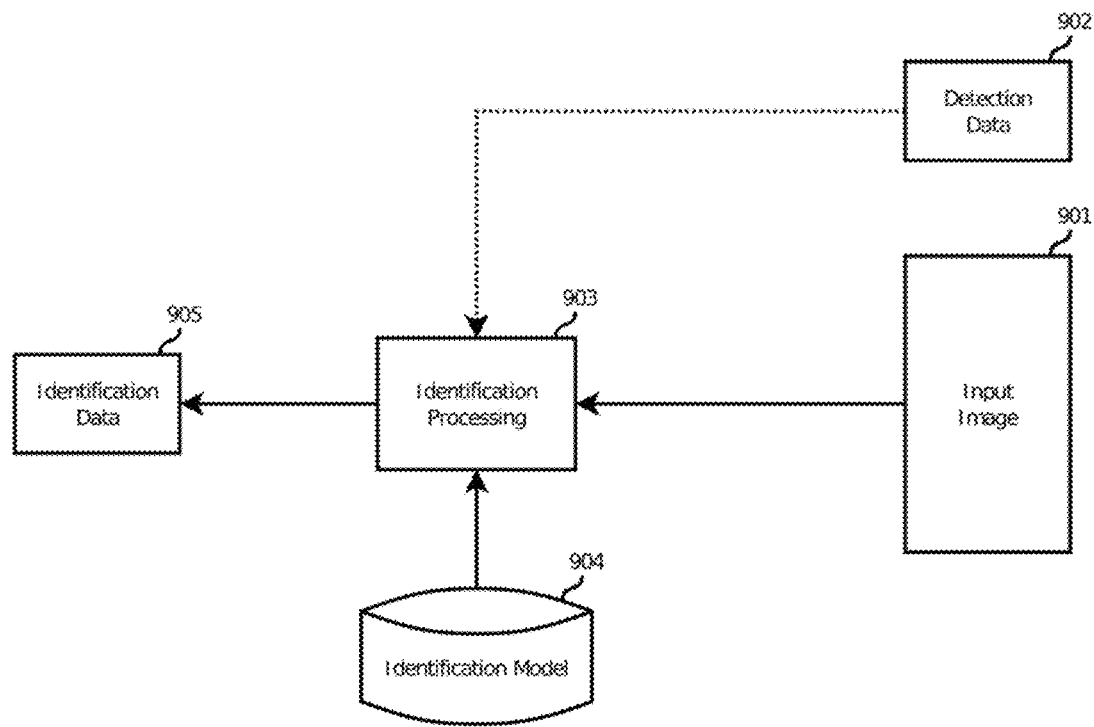
FIG. 9 is a functional diagram depicting the specific operation of the identification model used in the invention.

FIG. 9 is a functional diagram depicting the specific operation of identification processing 903. Identification processing 903 loads identification model 904 from permanent storage. Input image 901 is fed to identification processing 903 along with optional detection data 902. Identification processing 903 calculates identification data 905. Identification data 905 provides an understanding of finely grained identification of specific regions of input image 901 that is used to disambiguate more general classes provided by detection data 902. Identification models can be capable of using multiple images as well as a single image. The reason for optional detection data 902 is that some identification models require detection to propose regions where specific classes are detected whereas others do not.

Figure 10:
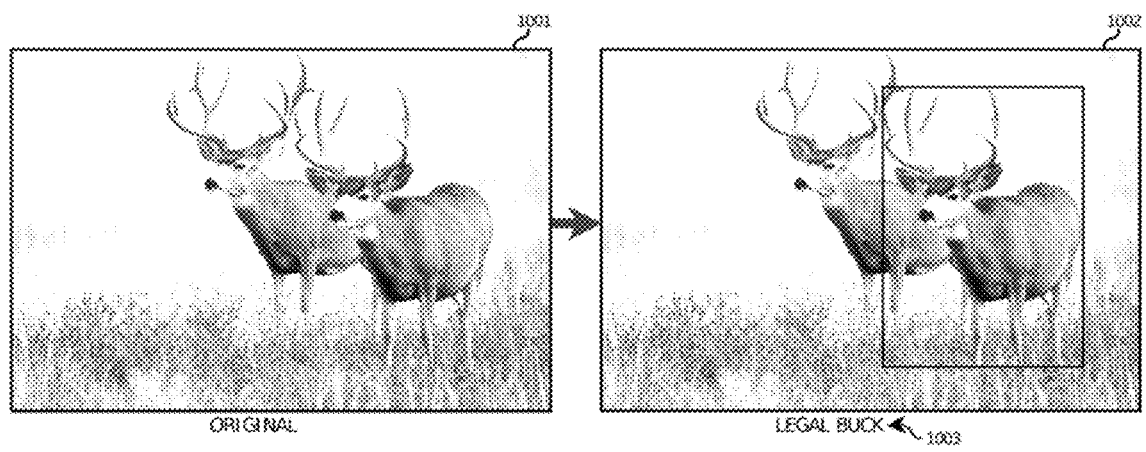
FIG. 10 is an illustration of what identification means visually.

FIG. 10 is a diagram illustrating the results of identification processing. When processed, input image 1001 is transformed into identification data 1002 that represents specific identification of instances of objects contained in input image 1001. Identification processing is the transformation of input image 1001 into identification data 1002 that represents object identification. An example of the difference between detection (classes) and identification applied to this illustration is that "deer" is a broad class of objects, but deer with certain features (male or female, number of points, or other specific characteristics) are being identified. The region that is marked in this figure is determined using detection processing, the identification data 1002 regarding the sub-image from detection processing is produced through identification processing, in this case identifying the sub-image as "legal buck." Identification processing typically is performed in conjunction with detection (as depicted in FIG. 9). This figure is a visual representation of identification processing applied to input image 1001; identification data 1002 is more typically a list that is based on the related detection data and the specific identifications produced through identification processing.

Figure 11:
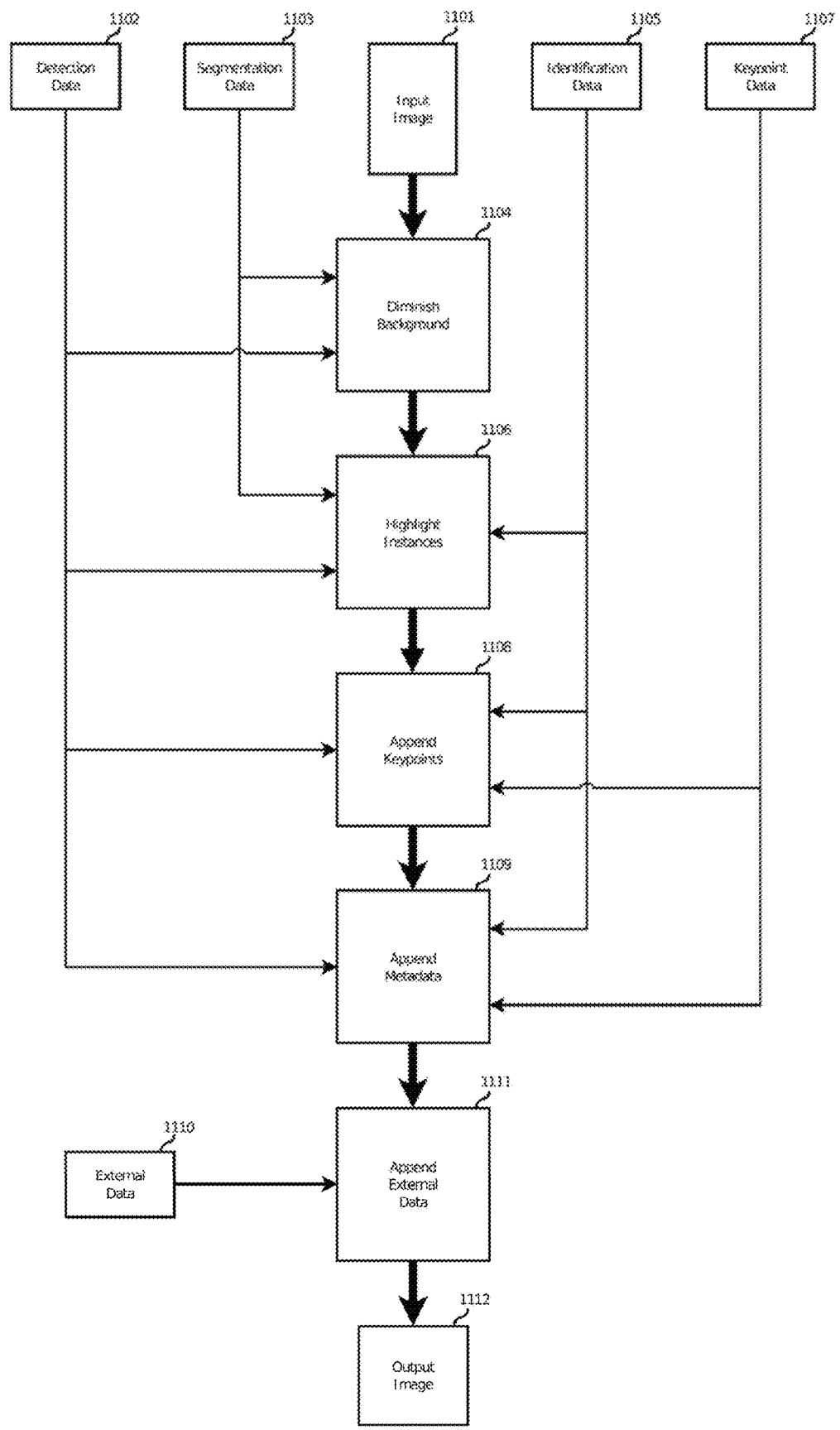
FIG. 11 is a functional diagram depicting visual cognition processing.

FIG. 11 is a functional diagram depicting visual cognition processing combining a single or plurality of input images 1101 with detection data 1102, segmentation data 1103, keypoint data 1107, identification data 1105 and external data 1110. Detection data 1102 and segmentation data 1103 are used along with a single or plurality of images 1101 in functional block Diminish Background 1104. Functional block Diminish Background 1104 renders the composite background darker to highlight one or more classes of interest based on detection data 1102 and segmentation data 1103. The result of functional block Diminish Background 1104 is passed to functional block Highlight Instances 1106 along with detection data 1102, segmentation data 1103 and identification data 1105. Functional block Highlight Instances 1106 renders the outline of instances of greatest interest based on detection data 1102, segmentation data 1103 and identification data 1105 in a visually distinct and discernable manner. The result of functional block Highlight Instances 1106 is passed to functional block Append Keypoints 1108 along with detection data 1102, keypoint data 1107 and identification data 1105. Functional block Append Keypoints 1108 renders keypoint data 1107 of interest prioritized by detection data 1102 and identification data 1105. The result of functional block Append Keypoints 1108 is passed to functional block Append Metadata 1109 along with detection data 1102, keypoint data 1107 and identification data 1105. Functional block Append Metadata 1109 renders relevant text and iconographic information and features based on detection data 1102, keypoint data 1107 and identification data 1105. The result of functional block Append Metadata 1109 is passed to functional block Append External Data 1111 along with external data 1110. Functional block Append External Data 1111 renders relevant text and iconographic information and features based on external data 1110. The result of functional block Append External Data 1111 is output image 1112. The description above does not limit operations such as kinematic modeling, Kalman filtering, morphological operations or other techniques known to one of ordinary skill in the art that are relevant to the general objective of processing data as described herein. The description of the above analyses are not intended to suggest an exclusive ordering of the operations. The ordering depicted is simply one embodiment wherein detection, segmentation, keypoint and identification data are combined with a single or plurality of images and external data to facilitate enhanced cognition and suggested action based on a scene represented in the image.

Figure 12:
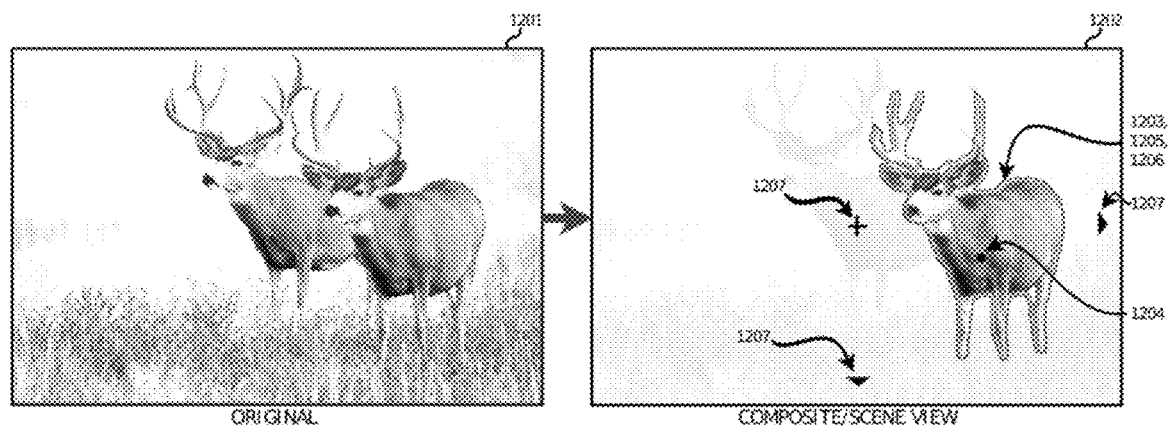
FIG. 12 is an illustration of an example of an input image and an output image altered by the invention visually.

FIG. 12 is an illustration of the result of the entire process from an initial scene 1201 to display 1202. It can be appreciated from the illustration that segmentation 1203, keypoint 1204, detection 1205, identification 1206 and metadata 1207 are apparent on the resulting display 1202. Segmentation 1203 is illustrated by the use of the segmentation to diminish the visual contribution of the background based on segmentation data, detection data and identification data. Keypoint 1204 is illustrated by the visual targeting dot on the illustration. Detection 1205 is illustrated by the selection of a class of object, which when combined with segmentation data and identification data is used to determine the specific region of interest of the object. Identification 1206 is illustrated by the specific instance of the detected and segmented object that is highlighted. Segmentation, detection and identification provide the necessary and sufficient information to provide visual cognitive augmentation to assist in determining prioritized objects in the field of view. Metadata 1207 is illustrated by the placement of an example reticule and directional indicators in the field of view to trigger behaviors based on visual cognition in the user of the invention.

Figure 13:
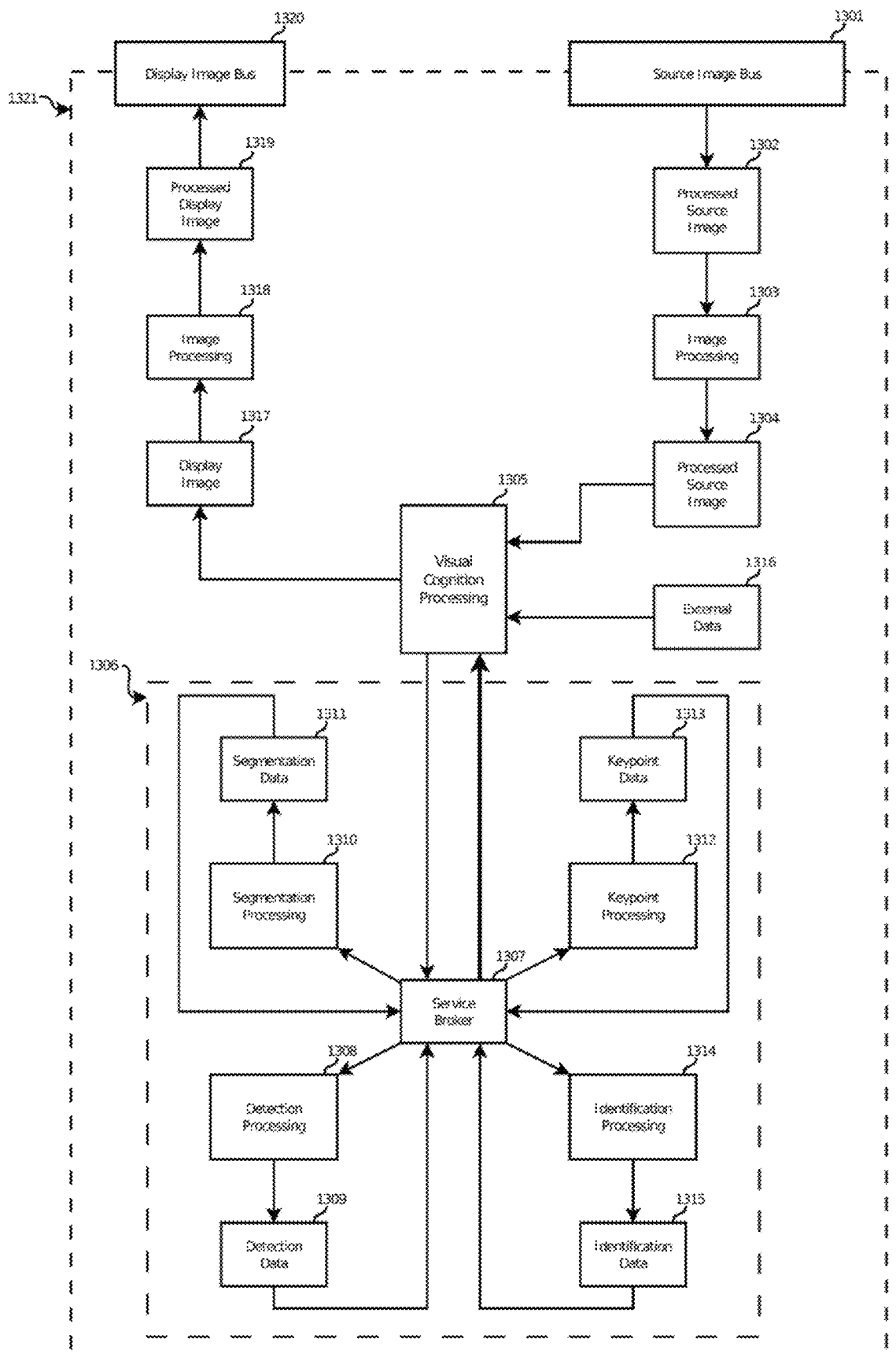
FIG. 13 is an alternative embodiment of the part of the system having high computational complexity.

FIG. 13 is a functional diagram of an alternative method of implementing block 131 in FIG. 1, which is the complex computational processing directly related to visual cognition processing. FIG. 13 depicts a service oriented architecture approach as block 1321, whereas block 131 in FIG. 1 depicts a data pipeline architecture approach. Block 1321 in FIG. 13 is a direct replacement using a different paradigm of computational organization for block 131 in FIG. 1.

In FIG. 13, a single or plurality of processed source images 1302 are retrieved from source image bus 1301. Image processing 1303 is applied to a single or plurality of processed source images 1302 to produce a single or plurality of processed source images 1304. Visual cognition processing 1305 retrieves a single or plurality of processed source images 1304 and external data 1316. Visual cognition processing 1305 uses service broker 1307, a member of a collection of computational resources 1306, to delegate the tasks of detection processing 1308, segmentation processing 1310, keypoint processing 1312 and identification processing 1314. Visual cognition processing 1305 organizes the appropriate order to provide each of detection processing 1308, segmentation processing 1310, keypoint processing 1312 and identification processing 1314 with the necessary data required by each. The result of detection processing 1308 is detection data 1309, which is returned to visual cognition processing 1305 through service broker 1307. The result of segmentation processing 1310 is segmentation data 1311, which is returned to visual cognition processing 1305 through service broker 1307. The result of keypoint processing 1312 is keypoint data 1313, which is returned to visual cognition processing 1305 through service broker 1307. The result of identification processing 1314 is identification data 1315, which is returned to visual cognition processing 1305 through service broker 1307. Visual cognition processing 1305 combines detection data 1309, segmentation data 1311, keypoint data 1313, identification data 1315 and external data 1316 to produce display image 1317. Display image 1317 undergoes image processing 1318 to produce processed display image 1319. Processed display image 1319 is placed on display image bus 1320.

Figure 14:
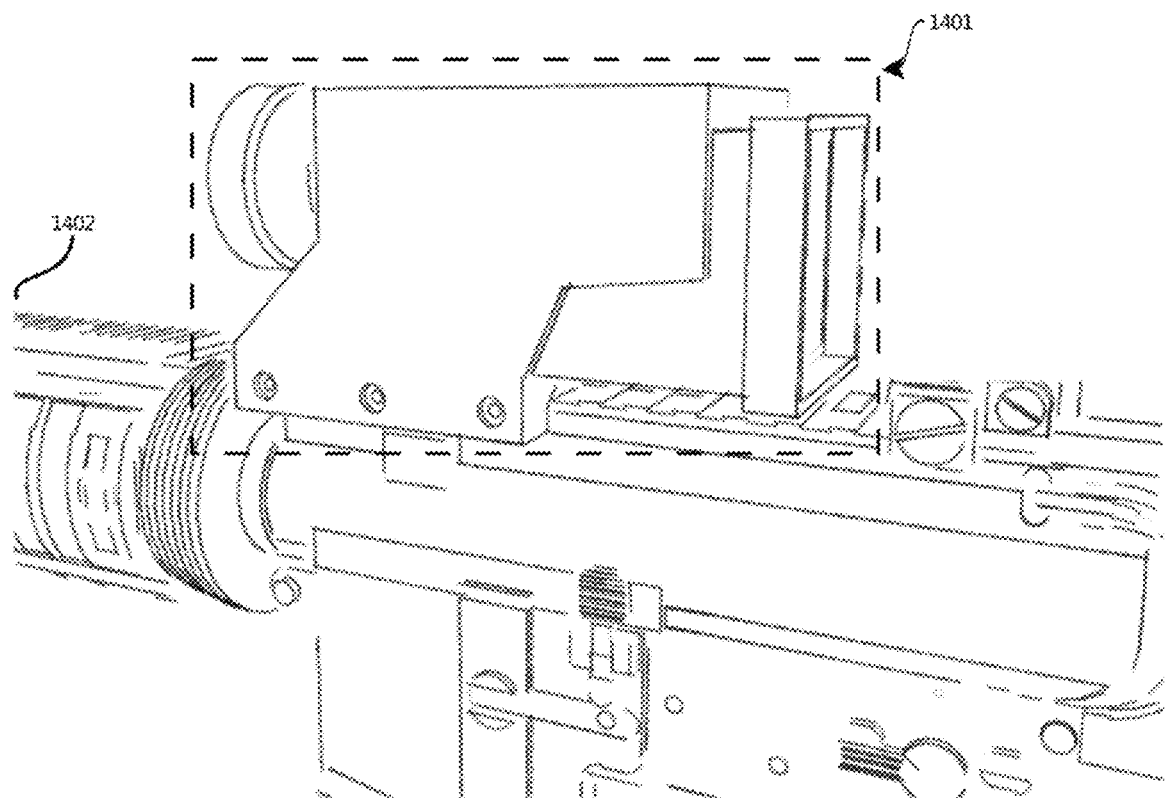
FIG. 14 is an illustration of mounting the sighting system mounted on a rifle in the embodiment where the complex computation is performed on the sighting system mounted to the rifle.

FIG. 14 is an illustration of an embodiment of the invention as a device 1401 mounted on a firearm 1402 that requires no external support apparatus. Note that placement is not defined by this invention; the user can mount device 1401 on firearm 1402 wherever is sensible for the specific user and application. Further note that the details of the mechanics of the mount are not defined by this invention. Without loss of generality, firearm 1402 could be a rifle, shotgun, machine gun, handgun or other type of similar weapon. The figure simply illustrates the general concept of device 1401 mounted on firearm 1402.

Figure 15:
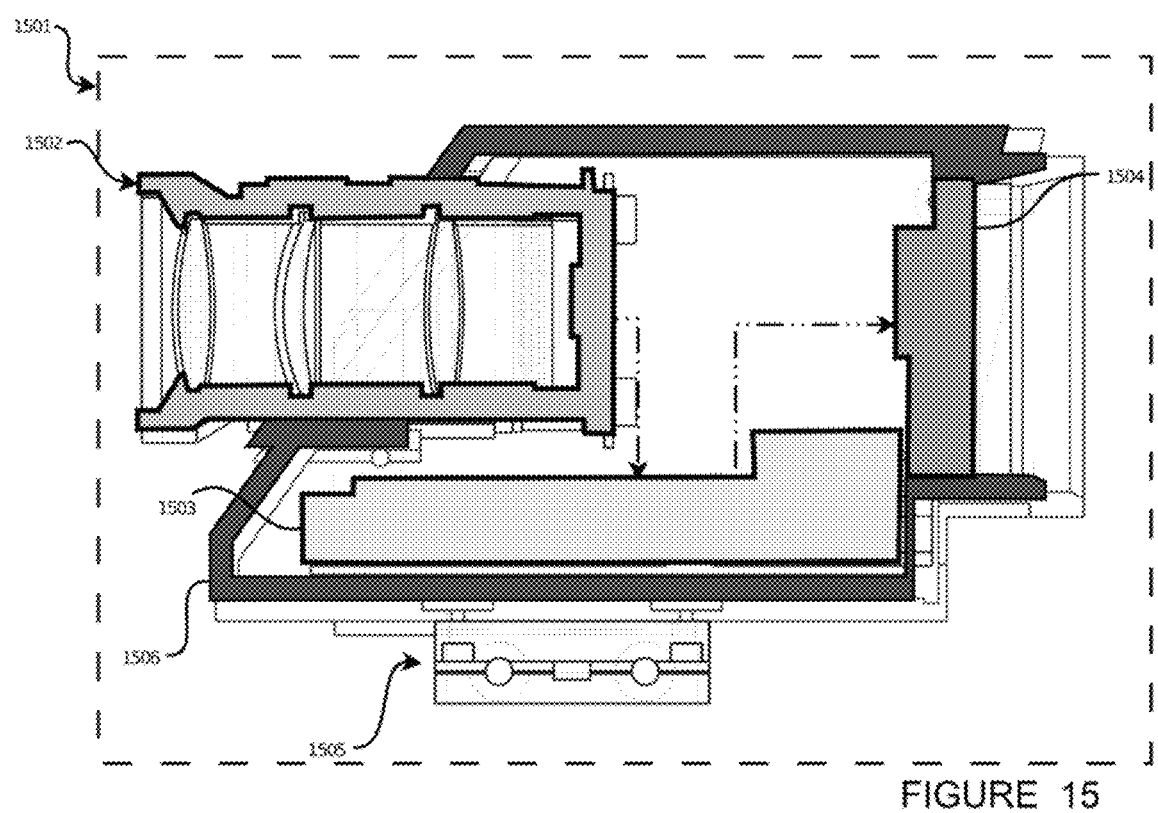
FIG. 15 is a functional diagram depicting the sighting system for a rifle where the complex computation is performed on the sighting system mounted to the rifle.

FIG. 15 is a functional diagram of the embodiment illustrated in FIG. 14. In FIG. 15 device 1501 consists of camera assembly 1502 that provides image data to processor 1503. Processor 1503 produces a display image that is displayed on display 1504. Camera assembly 1502, processor 1503 and display 1504 are mounted in chassis 1506. Mount 1505 is rigidly affixed to chassis 1506, and attaches device 1501 to a rifle. In this embodiment, the concept of a data bus is an internal structure used by processor 1503 and potentially camera assembly 1502 and display 1504 that is an abstraction for controlling the transport of data.

Figure 16:
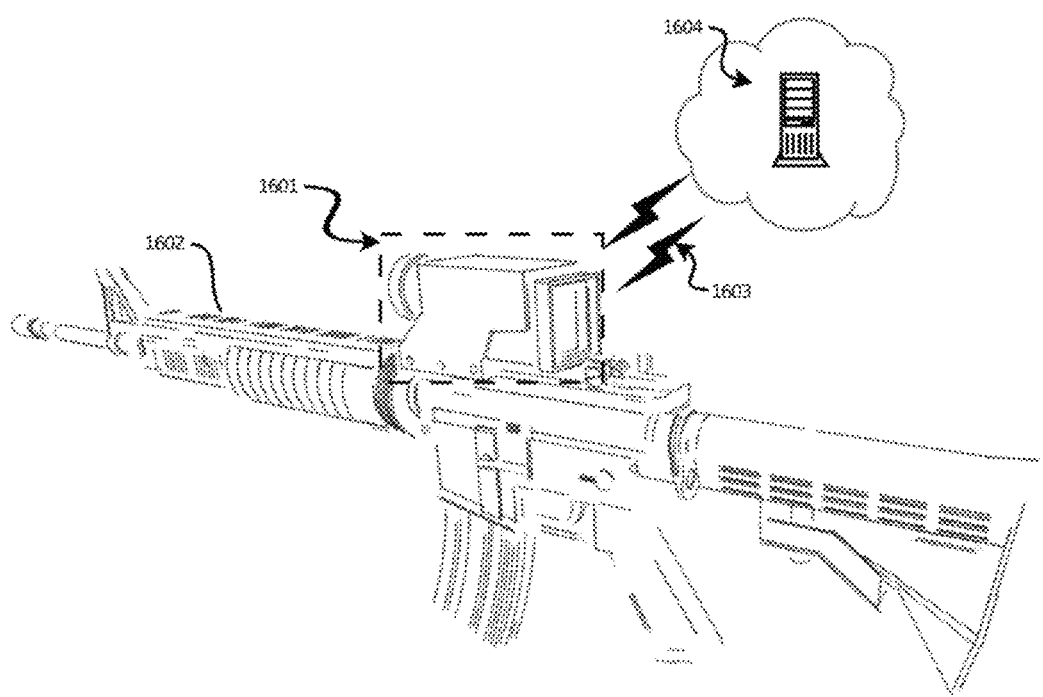
FIG. 16 is an illustration of mounting the sighting system mounted on a rifle in the embodiment where the computationally complex aspect of the invention is abstracted to an off-rifle computation facility by means of wireless busses.

FIG. 16 is an illustration of an embodiment of the invention as a device 1601 mounted on a rifle 1602 that requires external support apparatus 1604 that is capable of complex computation using wireless data bus 1603. As in FIG. 14, the illustration of this figure is not prescriptive regarding the type of weapon, where it is mounted or how the mount operates. In this figure the main differentiating feature is the computation support apparatus 1604 and the wireless data bus 1603. The purpose of the computation support apparatus 1604 is to offload the computationally complex aspects of the invention to a separate computation unit via wireless data bus 1603 to facilitate a simpler device 1601 that is capable of using less power. Aspects of FIG. 1 detail the specific nature of the separation of functionality between device 1601 and the external computation apparatus 1604 as depicted in this embodiment.

Figure 17:
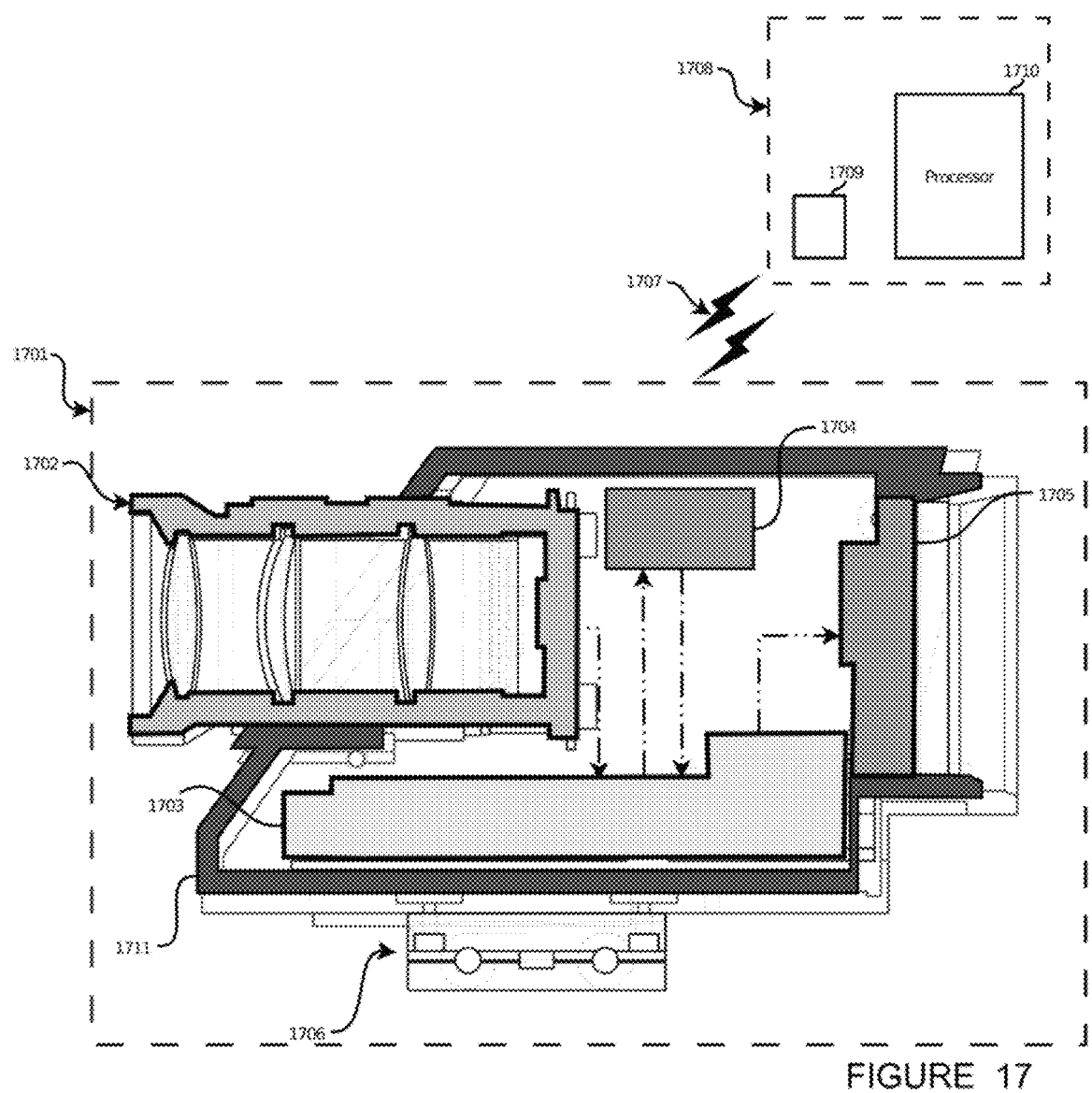
FIG. 17 is a functional diagram depicting the sighting system for a rifle where the computationally complex aspect of the invention is abstracted to an off-rifle computation facility by means of wireless busses.

FIG. 17 is a functional diagram of the embodiment illustrated in FIG. 16. In FIG. 17 device 1701 consists of camera assembly 1702 that provides image data to processor 1703. Processor 1703 uses wireless data bus adapter 1704 to communicate with off-device computation unit 1708 via wireless data bus 1707. Off-device computation unit 1708 consists of wireless bus adapter 1709 that communicates data to processor 1710. Upon processing, processor 1710 uses wireless bus adapter 1709 to communicate resultant data via wireless data bus 1707 to wireless bus adapter 1704 on device 1701. Wireless bus adapter 1704 communicates this data to processor 1703. Processor 1703 produces a display image that is displayed on display 1705. Camera assembly 1702, processor 1703, wireless bus adapter 1704 and display 1705 are mounted in chassis 1711. Mount 1706 is rigidly affixed to chassis 1711 and attaches device 1701 to a rifle. In this embodiment, the concept of a data bus is a wireless data connection shared between wireless bus adapter 1704 and wireless bus adapter 1709 via wireless data bus 1707. Wireless bus adapter 1704 and wireless bus adapter 1709 are also abstractions for controlling the transport of data.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification. When a range is stated herein, the range is intended to include all sub-ranges within the range, as well as all individual points within the range. When "about," "approximately," or like terms are used herein, they are intended to include amounts, measurements, or the like that do not depart significantly from the expressly stated amount, measurement, or the like, such that the stated purpose of the apparatus or process is not lost.

The present invention has been described with reference to certain preferred and alternative embodiments that are intended to be exemplary only and not limiting to the full scope of the present invention, as set forth in the appended claims.

We claim:

1. A system for visual cognition processing for sighting a firearm, the system comprising:
   at least one camera configured to capture at least one image;
   a processor;
   a memory;
   a communication system comprising a source image bus, a processing bus, and a display image bus;
   wherein said processor, said communication system, and said memory communicate with each other;
   said processor further configured to process said processed image using the steps of the method of processing said at least one image to generate at least processed display image, comprising:

capturing at least one image from said camera;
performing image processing on said at least one image to create at least one processed image and image processing data, said image processing comprising:
   detection data processing of said at least one image to create detection data;
   segmentation data processing of said at least one image to create segmentation data;
   keypoint data processing of said at least one image to create keypoint data; and
   identification data processing of said at least one image to create identification data;
   said image processing data comprising said detection data, said segmentation data, said keypoint data, and said identification data;
performing visual cognition processing on said at least one processed image to produce said at least one processed display image, said visual cognition processing comprising:
   diminishing a background of said at least one image using said detection data and said segmentation data;
   highlighting at least one instance of interest using said detection data, said segmentation data and said identification data;
   appending at least one keypoint using said detection data, said keypoint data and said identification data;
   appending metadata using said detection data, said keypoint data and said identification data; and
   appending external data to produce an output image; and
an image display configured to receive and display said at least one processed display image.

2. The system of claim 1 wherein said image processing further comprising a transformation chosen from the group consisting of geometric transformation, mask transformation, or point transformation, and wherein:
   said geometric transformation further includes one or more processing actions selected from the group consisting of lens distortion correction, lens correction, scale change, cropping, reflection, rotation, or shear;
   said mask transformation further includes one or more processing actions selected from the group consisting of blurring, sharpening, or spatial spectral
   said point transformation further includes one or more processing actions selected from the group consisting of contrast, brightness, gamma correction, or color manipulation.

3. The system of claim 1 wherein said detection data processing further comprises:
   loading a detection model from said memory to a detection processing unit; and
   computation of said detection data based on said at least one image.

4. The system of claim 1 wherein said segmentation data processing further comprises:
   loading a segmentation model from said memory to a segmentation processing unit; and
   computation of said segmentation data based on said at least one image and said detection data using the segmentation processing unit.

5. The system of claim 1 wherein said keypoint data processing further comprises:
   loading a keypoint model from said memory to a keypoint processing unit;
   computation of said keypoint data based on said at least one image and said detection data using the keypoint processing unit.

6. The system of claim 1 wherein said identification data processing further comprises:
   loading an identification model from said memory to an identification processing unit; and
   computation of said identification data based on said at least one image and detection data using the identification processing unit.

7. A system for visual cognition processing for sighting a firearm, the system comprising:
   at least one camera configured to capture at least one image, said at least camera configured to operate in at least one operating light spectrum selected from the group consisting of visible, near infrared, long wave infrared, and thermal imaging;
   a processor;
   a memory;
   a communication system comprising a source image bus, a processing bus, and a display image bus;
   wherein said processor, said communication system, and said memory communicate with each other;
   said processor further configured to process said processed image using the steps of the method of processing said at least one image to generate at least processed display image, comprising:
   capturing at least one image from said camera;
   performing image processing on said at least one image to create at least one processed image and image processing data, said image processing comprising a transformation chosen from the group consisting of geometric transformation, mask transformation, or point transformation, and wherein:
      said geometric transformation further includes one or more processing actions selected from the group consisting of lens correction, scale change, cropping, reflection, rotation, or shear;
      said mask transformation further includes one or more processing actions selected from the group consisting of blurring, sharpening, or spatial spectral; and
      said point transformation further includes one or more processing actions selected from the group consisting of contrast, brightness, gamma correction, or color manipulation;
   performing visual cognition processing on said at least one processed image to produce said at least one processed display image; and
   an image display configured to receive and display said at least one processed display image.

8. The system of claim 7, said image processing further comprising:
   detection data processing of said at least one image to create detection data;
   segmentation data processing of said at least one image to create segmentation data;
   keypoint data processing of said at least one image to create keypoint data; and
   identification data processing of said at least one image to create identification data;
   said image processing data comprising said detection data, said segmentation data, said keypoint data, and said identification data.

9. The system of claim 8, wherein said detection data processing further comprises:

loading a detection model from said memory to a detection processing unit; and
computation of said detection data based on said at least one image.

10. The system of claim 8 wherein said segmentation data processing further comprises:
loading a segmentation model from said memory to a segmentation processing unit; and
computation of said segmentation data based on said at least one image and said detection data using the segmentation processing unit.

11. The system of claim 8 wherein said keypoint data processing further comprises:
loading a keypoint model from said memory to a keypoint processing unit;
computation of said keypoint data based on said at least one image and said detection data using the keypoint processing unit.

12. The system of claim 8 wherein said identification data processing further comprises:
loading an identification model from said memory to an identification processing unit; and
computation of said identification data based on said at least one image and detection data using the identification processing unit.

13. The system of claim 8 wherein said visual cognition processing further comprises:
diminishing a background of said at least one image using said detection data and said segmentation data;
highlighting at least one instance of interest using said detection data, said segmentation data and said identification data;
appending at least one keypoint using said detection data, said keypoint data and said identification data;
appending metadata using said detection data, said keypoint data and said identification data; and
appending external data to produce an output image.

14. A method for visual cognition processing for sighting a firearm using a system having a camera, a processor and a display, the method comprising:
capturing at least one image from the camera;
performing image processing on said at least one image to create at least one processed image and image processing data, said image processing comprising:
detection data processing of said at least one image to create detection data;
segmentation data processing of said at least one image to create segmentation data;
keypoint data processing of said at least one image to create keypoint data; and
identification data processing of said at least one image to create identification data;
said image processing further comprising a transformation chosen from the group consisting of geometric transformation, mask transformation, or point transformation, and wherein:
said geometric transformation further includes one or more processing actions selected from the group consisting of lens correction, scale change, cropping, reflection, rotation, or shear;
said mask transformation further includes one or more processing actions selected from the group consisting of blurring, sharpening, or spatial spectral; and
said point transformation further includes one or more processing actions selected from the group consisting of contrast, brightness, gamma correction, or color manipulation;
said image processing data comprising said detection data, said segmentation data, said keypoint data, and said identification data;
performing visual cognition processing on said at least one processed image to produce said at least one processed display image; and
displaying said at least one processed display image on the display.

15. The method of claim 14 wherein said segmentation data processing further comprises:
loading a segmentation model from said memory to a segmentation processing unit; and
computation of said segmentation data based on said at least one image and said detection data using the segmentation processing unit.

16. The method of claim 14 wherein said keypoint data processing further comprises:
loading a keypoint model from said memory to a keypoint processing unit;
computation of said keypoint data based on said at least one image and said detection data using the keypoint processing unit.

17. The method of claim 14 wherein said identification data processing further comprises:
loading an identification model from said memory to an identification processing unit; and
computation of said identification data based on said at least one image and detection data using the identification processing unit.

18. The method of claim 14 wherein said visual cognition processing further comprises:
diminishing a background of said at least one image using said detection data and said segmentation data;
highlighting at least one instance of interest using said detection data, said segmentation data and said identification data;
appending at least one keypoint using said detection data, said keypoint data and said identification data;
appending metadata using said detection data, said keypoint data and said identification data; and
appending external data to produce an output image.

* * * * *